May 9, 1961 B. B. HARRIS 2,983,175
FOAM GLASS SHAPING DEVICE
Filed Feb. 9, 1959 3 Sheets-Sheet 1

INVENTOR.
BENFORD B. HARRIS
BY
Gustave Miller
ATTORNEY

May 9, 1961  B. B. HARRIS  2,983,175
FOAM GLASS SHAPING DEVICE
Filed Feb. 9, 1959  3 Sheets-Sheet 2

INVENTOR.
BENFORD B. HARRIS
BY
Gustav Miller
ATTORNEY

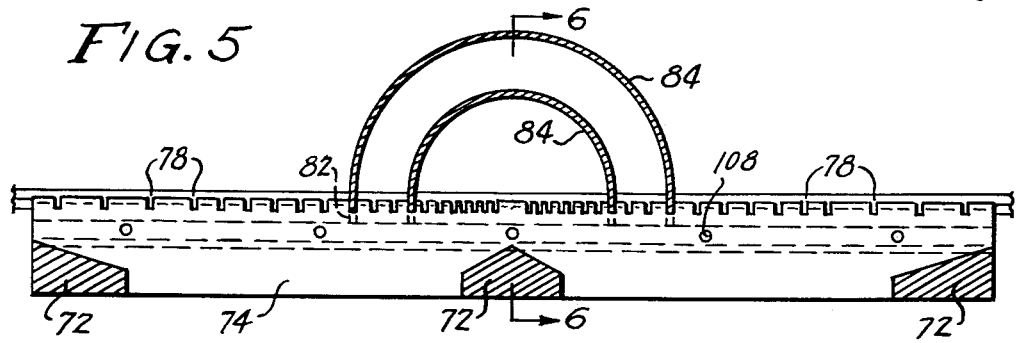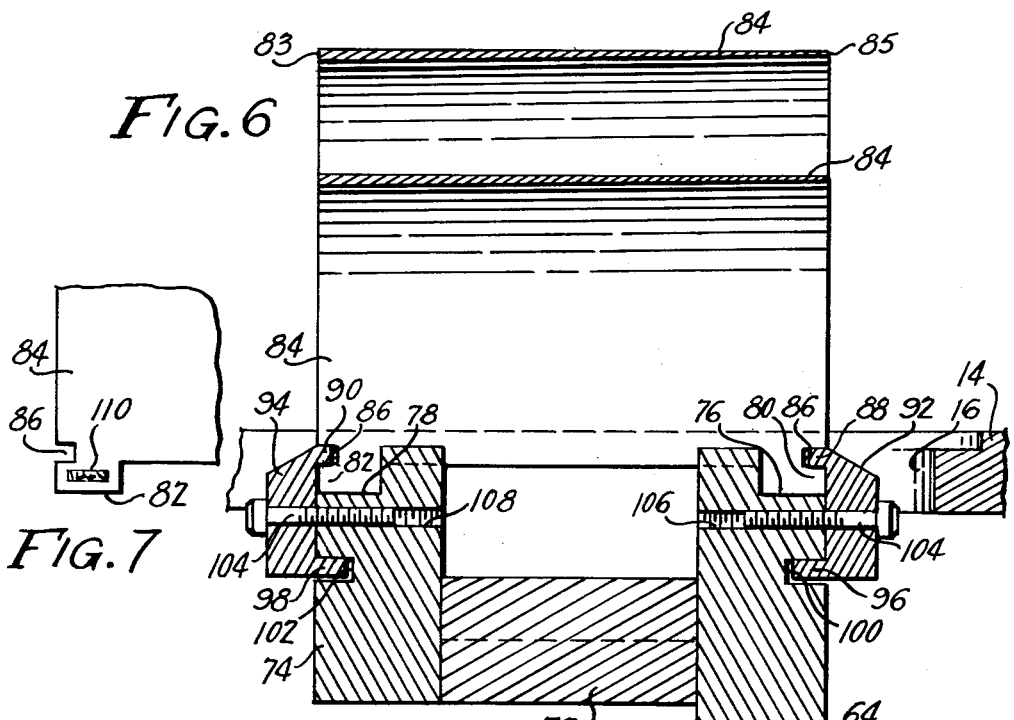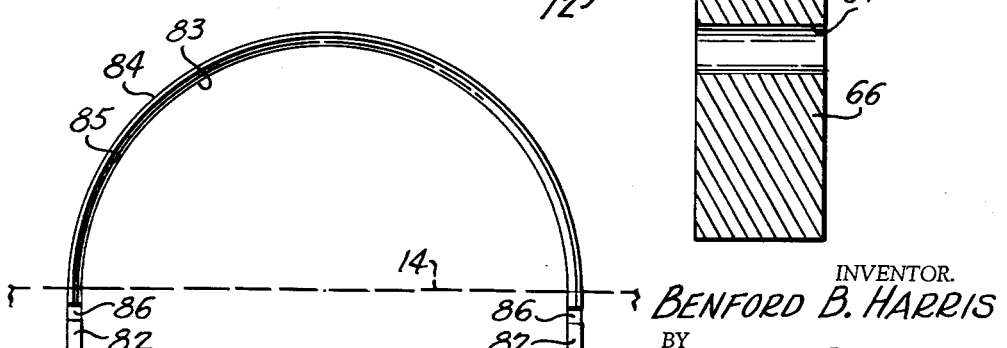

United States Patent Office 2,983,175
Patented May 9, 1961

2,983,175
FOAM GLASS SHAPING DEVICE

Benford B. Harris, Coral Gables, Fla.
(1275 Inwood Tr., Fort Lee, N.J.)

Filed Feb. 9, 1959, Ser. No. 792,127

3 Claims. (Cl. 83—635)

This invention relates to a shaping device, and it particularly relates to a device for shaping foam glass.

Foam glass is used for various purposes. One such important purpose is for covering pipes in the form of insulation. This requires machining of the raw foam glass into the desired configurations. However, it has been found that ordinary cutting or sawing tools are not completely effective for this purpose.

It is, therefore, one object of the present invention to overcome the aforementioned as well as other difficulties by providing a shaping device which effectively shapes the foam glass into the desired contours without either cutting or sawing the glass material.

Another object of the present invention is to provide a shaping device of the aforesaid type which is easy to use and which is adjustable to various sizes and shapes.

Another object of the present invention is to provide a shaping device of the aforesaid type which is relatively simple in construction and not subject to mechanical breakdowns in operation.

Other objects of the present invention are to provide an improved shaping device, of the character described, that is easily and economically produced, which is sturdy in construction and which is highly efficient in operation.

Figures 1, 2:
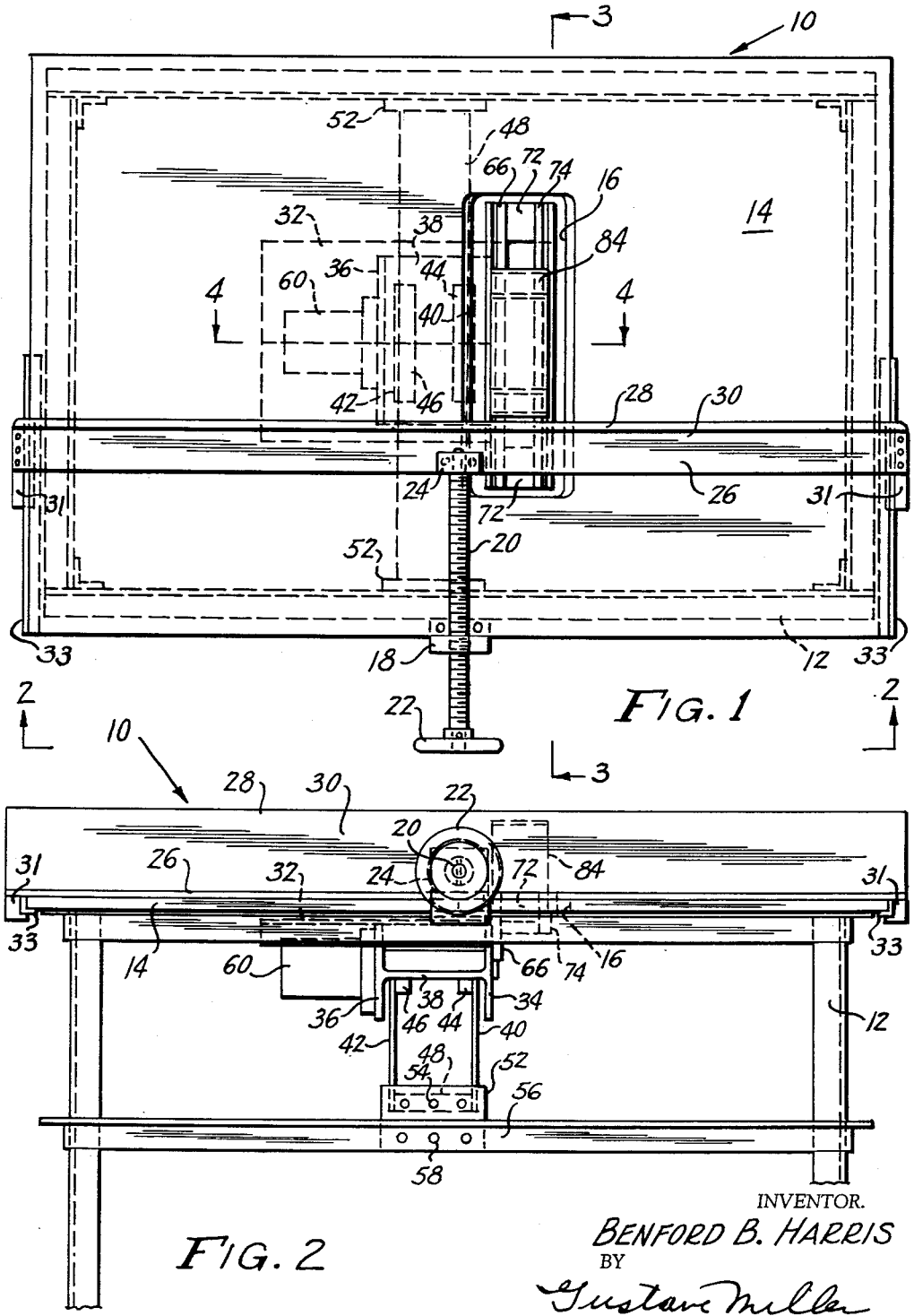

With the above and related objects in view, this invention consists in the details of construction and combination of parts, as will be more fully understood from the following description, when read in conjunction with the accompanying drawings in which:

Fig. 1 is a top plan view of a device embodying the present invention.

Figure 3:
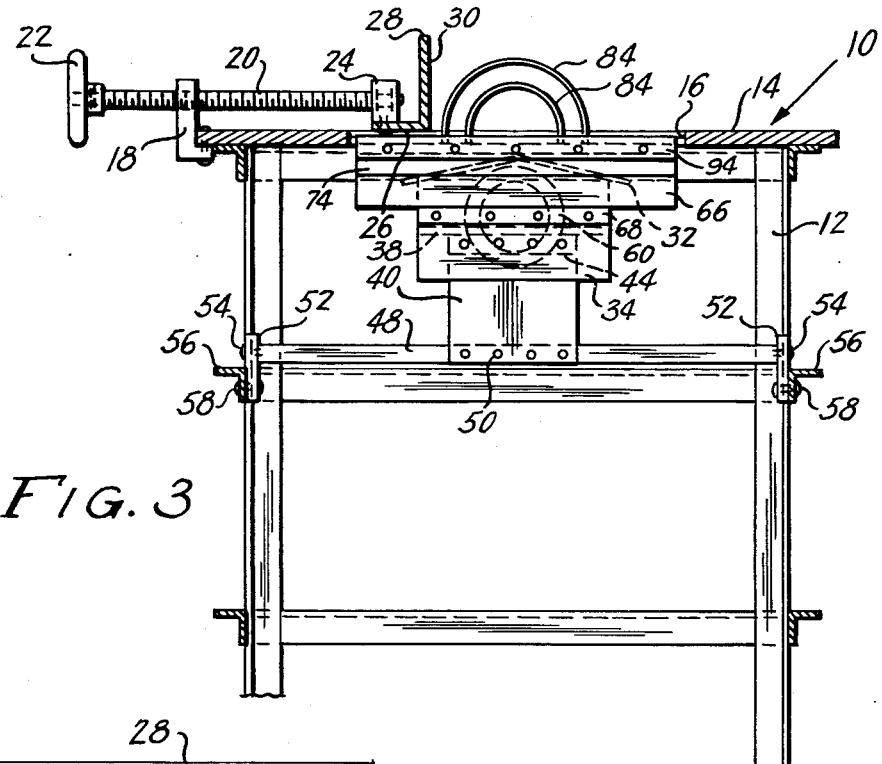
Figure 4:
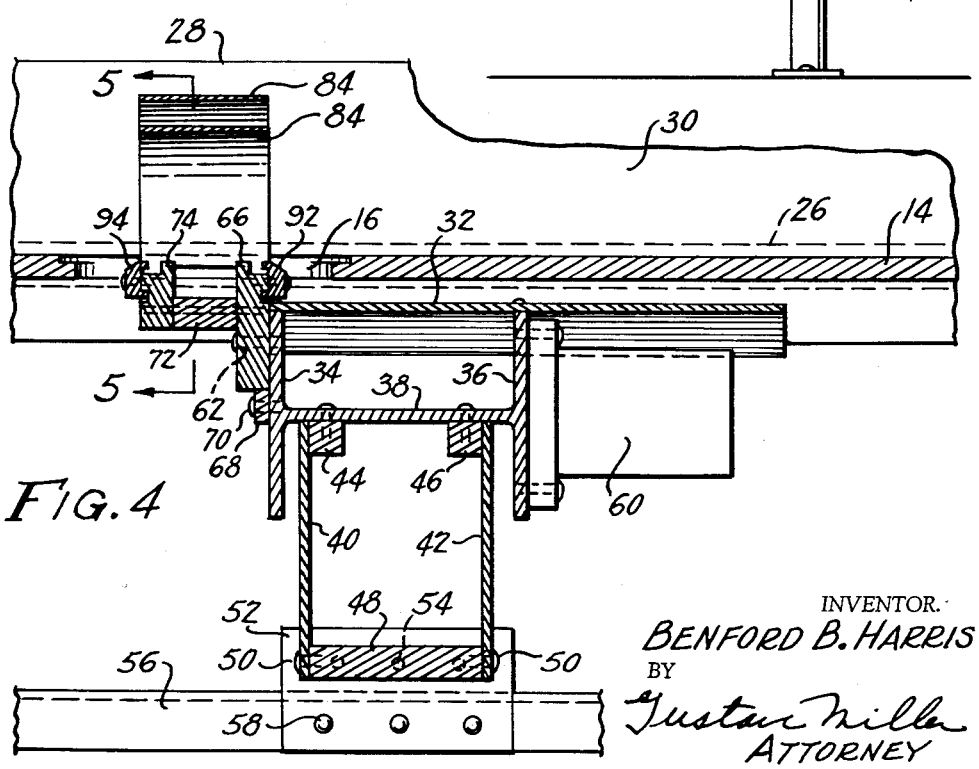

Fig. 2 is an end view taken on line 2—2 of Fig. 1.
Fig. 3 is a sectional view taken on line 3—3 of Fig. 1.
Fig. 4 is a sectional view taken on line 4—4 of Fig. 1.
Fig. 5 is a sectional view taken on line 5—5 of Fig. 4.
Fig. 6 is a sectional view taken on line 6—6 of Fig. 5.
Fig. 7 is a fragmentary detailed view of a portion of the shaper blade.
Fig. 8 is an elevational view of a shaper blade.

Referring in greater detail to the drawings wherein similar reference characters refer to similar parts, there is shown a shaping device, generally designated 10, comprising a supporting framework 12 on which is positioned a table top 14 forming the base or work supporting surface.

At approximately the center of the table top 14 is provided a generally rectangular aperture 16 while at one side of the table top 14 is provided a bracket 18 having a threaded opening through which extends a threaded shaft 20. The shaft 20 has an operating handle wheel 22 at one end adapted for manual operation, and is connected at its other end to a boss 24 mounted on the lower, horizontal web 26 of an angle bar 28 having an upstanding vertical web 30. The angle bar 28 is slidably adjustable across the width of the table 14 by means of the threaded shaft 20, and the vertical web 30 acts as a guide for the workpiece in the manner hereinafter described, the web 30 being guided by depending flanges 31 extending under guide rails 33 on the opposite ends of the table top 14.

Beneath the table top 14, adjacent the aperture 16, is provided a plate 32 mounted on a pair of spaced vertical flanges 34 and 36 connected by a horizontal web 38 extending medially thereof. The web 38 is itself positioned on a pair of flexible plates 40 and 42 by means of blocks 44 and 46.

The flexible plates 40 and 42 are connected at their lower ends to a transverse bar 48 by means of rivets 50 or the like. The bar 48 extends across almost the width of the table top 14, but underneath it, and is connected at its ends to mounting plates 52 by means of rivets or the like 54. The mounting plates 52 are themselves connected to cross-bars 56 of the frame 12 by means of rivets or the like indicated at 58.

The flange 36 is provided with a vibrator 60 of a standard type. Since the vibrator 60 is of a standard type it will not be described in any greater detail here except to state that it is connected in the ordinary manner to a motor or other drive means (not shown).

The opposite flange 34 is provided with a series of apertures to receive rivets or the like 62, these rivets 62 extending through corresponding apertures 64 in a block 66. This block 66 is also supported by a rail 68 connected to flange 34 by rivets or the like 70.

The block 66 is connected by means of horizontal spacers 72 to a parallel bar 74. Both the block 66 and bar 74 are provided with a series of slots, as at 76 and 78 respectively, and in these slots 76 and 78 are adapted to be received the flanges 80 and 82 provided at each corner of each end of an arcuate shaper blade 84; two such concentric blades 84 being illustrated in order to define half of a cylinder having inner and outer walls. The blades 84 are wedge shaped in longitudinal sections tapering from a thick edge 83 to a thin edge 85. The blades 84 extend upwardly through aperture 16.

The blades 84 may be of various arcuate lengths depending on the size of the workpiece. However, a series of slots 76 and 78 are provided on block 66 and bar 74 to accommodate these various blade sizes.

The blades 84 are provided with slots 86 adjacent each flange 80 and 82 and in these slots 86 are positioned latch fingers 88 and 90 respectively formed on opposed latch bars 92 and 94. The latch bars 92 and 94 are also each provided with lower fingers, as at 96 and 98 respectively; these fingers 96 and 98 being received in corresponding slots 100 and 102 in block 66 and bar 74 respectively. The latch bars 92 and 94 are additionally provided with apertures through which extend lock screws 104. These screws 104 are threadedly engaged in threaded openings 106 and 108 respectively in block 66 and bar 74.

In order to identify the various size blades 84, each is preferably provided with a code number or other indicia, as is generally indicated at 110 in Fig. 7.

In the operation of the device, a block of foam glass is placed on the table top 14 and, while guided by the web 30 of angle bar 28 which has been adjusted by means of threaded rod 20 to the desired position, the block of foam glass is manually pushed against the thin edges 85 of the wedged shapers 84 while these shapers are being vibrated by vibrator 60. The vibrating motion of vibrator 60 is translated to the blades 84 through the flexible plates 40 and 42 which vibrate in conjunction with vibrator 60.

The concentric, wedge shaped in longitudinal sections, arcuate blades 84 define between them the inner and outer peripheries of a cylinder and this shape is imposed on the block of foam glass by the vibrating action of the blades 84. This vibrating action crushes the glass cells of the foam glass block in the path of the blades 84 and thereby imposes the corresponding shape on the block. It is not a cutting or sawing action since no severance of the block material takes place. Instead, it is more in the nature of a peening action where the individual glass cells are crushed and deformed into the desired shape.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A shaping device for foam glass comprising a table support, a horizontal work-supporting table on said table support, a guide bar adjustable over said table, a vibratory tool extending through an aperture in said table in the path of a foam glass work piece to be supported on said table and guided against said adjustable guide bar, a vibrator means for operating said vibratory tool, and a flexible mounting means for supporting said vibrator means and said vibratory tool on said table support comprising a pair of spaced apart parallel upstanding flexible plates secured at their bottom edges to said table support and secured at their top edges to a pair of spaced apart rigid vertical flanges connected by a rigid horizontal web, said vibrator means being secured on one of said rigid vertical flanges, said vibratory tool being secured on the other of said rigid vertical flanges and supporting the shaping edge of said vibratory tool extending in a plane parallel to the planes of said parallel flexible upstanding plates and at right angles to the direction of said guide bar.

2. The shaping tool of claim 1, said vibratory tool comprising a pair of spaced apart shaping blades each tapered from a thick edge to a thin edge.

3. The shaping tool of claim 1, said guide bar having depending flanges extending under guide rails secured at the opposite sides of said table, a bracket secured to a side of said table connecting said guide rail sides, a threaded shaft threaded through said bracket terminating at one end in a handle wheel and connected at its other end to said adjustable guide bar for adjusting the same.

References Cited in the file of this patent

UNITED STATES PATENTS

| | | |
|---|---|---|
| 1,316,751 | Wilks | Sept. 23, 1919 |
| 2,609,048 | Samans | Sept. 2, 1952 |